(12) United States Patent
Watanabe

(10) Patent No.: US 9,627,887 B2
(45) Date of Patent: Apr. 18, 2017

(54) POWER SUPPLY STATE MONITORING DEVICE, POWER SUPPLY STATE MONITORING METHOD, AND PROGRAM

(75) Inventor: Manabu Watanabe, Tokyo (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 805 days.

(21) Appl. No.: 14/001,328

(22) PCT Filed: Feb. 7, 2012

(86) PCT No.: PCT/JP2012/052660
§ 371 (c)(1),
(2), (4) Date: Aug. 23, 2013

(87) PCT Pub. No.: WO2012/132555
PCT Pub. Date: Oct. 4, 2012

(65) Prior Publication Data
US 2013/0328396 A1    Dec. 12, 2013

(30) Foreign Application Priority Data
Mar. 30, 2011    (JP) .................. 2011-076575

(51) Int. Cl.
*H02J 3/00*    (2006.01)
*G06F 11/30*   (2006.01)
(Continued)

(52) U.S. Cl.
CPC ............... *H02J 3/00* (2013.01); *G06F 1/263* (2013.01); *G06F 1/28* (2013.01); *G06F 11/3062* (2013.01); *Y10T 307/305* (2015.04)

(58) Field of Classification Search
CPC ...................................... H02J 3/00
(Continued)

(56) References Cited

U.S. PATENT DOCUMENTS

| 4,323,987 A | 4/1982 | Holtz et al. |
| 6,018,204 A | 1/2000 | Kuruma |

(Continued)

FOREIGN PATENT DOCUMENTS

| JP | 08-123705 A | 5/1996 |
| JP | 10-207579 A | 8/1998 |

(Continued)

OTHER PUBLICATIONS

Communication dated Nov. 6, 2014, issued by the European Patent Office in counterpart European application No. 12763762.7.
(Continued)

*Primary Examiner* — Rexford Barnie
*Assistant Examiner* — Daniel Kessie
(74) *Attorney, Agent, or Firm* — Sughrue Mion, PLLC

(57) ABSTRACT

Provided is a power supply state monitoring device and so on which is capable of notifying a user of the fact that there is a problem with an AC cord and the fact that a power supply apparatus itself is not mounted separately. The power supply state monitoring device is a device which is provided in a main body of an apparatus in which a first power supply apparatus including an AC cord and a second power supply apparatus including an AC cord can be mounted, and monitors the state of power to be supplied from the second power supply apparatus to the main body of the apparatus when power is supplied from the first power supply apparatus to the main body of the apparatus, determines whether or not the second power supply apparatus is mounted in the main body of the apparatus based on a power-supply mount-state notification signal from the second power supply apparatus, if the second power supply apparatus is mounted in the main body of the apparatus, determines whether or not the power is supplied from the AC cord of the second power supply apparatus based on an AC-supply state notification signal
(Continued)

from the second power supply apparatus, and if the power is not supplied from the AC cord, notifies a user of the fact that the second power supply apparatus is mounted in the main body of the apparatus and the power is not supplied from the AC cord.

18 Claims, 6 Drawing Sheets

(51) Int. Cl.
  *G06F 1/26* (2006.01)
  *G06F 1/28* (2006.01)
(58) Field of Classification Search
  USPC .......................................................... 307/18
  See application file for complete search history.

(56) References Cited

U.S. PATENT DOCUMENTS

| | | |
|---|---|---|
| 2003/0079132 A1 | 4/2003 | Bryant |
| 2005/0017582 A1* | 1/2005 | Young .................. G09G 3/3413 307/64 |
| 2005/0034003 A1* | 2/2005 | Sato ..................... G06F 11/2015 713/340 |
| 2009/0179490 A1 | 7/2009 | Nagao |
| 2010/0207588 A1* | 8/2010 | Lowenthal .......... B60L 11/1816 320/165 |

FOREIGN PATENT DOCUMENTS

| | | |
|---|---|---|
| JP | 2009-165306 A | 7/2009 |
| JP | 2009-169551 A | 7/2009 |

OTHER PUBLICATIONS

International Search Report for PCT/JP2012/052660, dated Mar. 6, 2012.

\* cited by examiner

| STATE OF POWER SUPPLY (MONITORED RESULT) | INST-1 | INST | PW OK |
|---|---|---|---|
| POWER SUPPLY IS NOT MOUNTED | H | H | H |
| POWER SUPPLY IS MOUNTED/THERE IS PROBLEM WITH AC CORD | L | H | H |
| POWER SUPPLY IS MOUNTED/ABNORMAL OPERATION OF POWER SUPPLY | L | L | L |
| POWER SUPPLY IS MOUNTED/NORMAL OPERATION OF POWER SUPPLY | L | L | H |

| STATE OF POWER SUPPLY (MONITORED RESULT) | INST | PW OK |
|---|---|---|
| POWER SUPPLY IS NOT MOUNTED | H | H |
| POWER SUPPLY IS MOUNTED/THERE IS PROBLEM WITH AC CORD | H | H |
| POWER SUPPLY IS MOUNTED/ABNORMAL OPERATION OF POWER SUPPLY | L | L |
| POWER SUPPLY IS MOUNTED/NORMAL OPERATION OF POWER SUPPLY | L | H |

POWER SUPPLY STATE MONITORING DEVICE, POWER SUPPLY STATE MONITORING METHOD, AND PROGRAM

CROSS REFERENCE TO RELATED APPLICATIONS

This application is a National Stage of International Application No. PCT/JP2012/052660 filed Feb. 7, 2012, claiming priority based on Japanese Patent Application No. 2011-076575 filed Mar. 30, 2011, the contents of all of which are incorporated herein by reference in their entirety.

TECHNICAL FIELD

The present invention relates to a power supply state monitoring device, a power supply state monitoring method, and a program which monitors the state of power supplied from a power supply apparatus to a main body of an apparatus.

BACKGROUND ART

Apparatuses (main bodies of apparatuses) that require power supply for their operation include an apparatus configured to be supplied with power from a power supply apparatus mounted in the apparatus itself. The power supply apparatus is provided with an AC (alternating current) cord, and power obtained by, for example, inserting the AC cord into a socket is supplied to a main body of an apparatus via the power supply apparatus. Such a configuration is disclosed in, for example, Patent Document 1.

PRIOR ART DOCUMENT

Patent Document

Patent Document 1: Japanese Unexamined Patent Application, First Publication No. 2009-165306

SUMMARY OF INVENTION

Problems to be Solved by the Invention

However, the above-described configuration does not consider the necessity of notifying a user of the state in which the power supply apparatus is mounted but power is not supplied due to a problem with its AC cord (e.g., the AC cord is not connected to a socket or the power supply apparatus, or there is a failure in the AC cord) in distinction from the state in which power is not supplied because the power supply apparatus itself is not mounted in the main body of the apparatus. Therefore, it is impossible to notify a user of the fact that there is a problem with the AC cord and the fact that the power supply apparatus itself is not mounted separately. A specific example thereof will be described below with reference to FIG. 1 and FIG. 5 to FIG. 7.

For example, as shown in FIG. 1, it is assumed that two power supply apparatuses 11 and 12 can be mounted in a tape library apparatus 10 (an example of the main body of the apparatus) to secure the redundancy. FIG. 5 illustrates the circuit configurations of the tape library apparatus 10 and the power supply apparatuses 11 and 12. Although FIG. 5 illustrates the circuit of the tape library apparatus and the circuit of a power supply apparatus in a one-to-one relationship, the relationship as shown by the configuration of FIG. 5 exists between each of the circuits of the power supply apparatuses 11 and 12 and the circuit of the tape library apparatus. Thus, the power supply states of both the power supply apparatuses 11 and 12 are monitored by the tape library apparatus 10. It is to be noted that for the sake of convenience, the description here assumes an example in which the circuit of the power supply apparatus in FIG. 5 is the circuit of the power supply apparatus 12, and the power supply apparatus 12 is monitored (the power supply apparatus 11 is mounted in the tape library apparatus 10 and is operating normally, and there is no problem with its AC cord).

An INST signal (an open-collector output) is pulled up in the tape library apparatus 10 using a resistor 6. When power (an AC voltage) is supplied from an AC cord 14 of the power supply apparatus 12, the voltage supplied to a resistor 3 is set to a high level, a transistor 1 is turned on, and the INST is set to a low level. In contrast, when power is not supplied from the AC cord 14 of the power supply apparatus 12, the transistor 1 is turned off, and the INST is set to a high level. That is, it can be said that the INST is an AC-supply state notification signal indicating whether or not power is supplied from an AC cord.

A PW OK signal (an open-collector output) is pulled up in both the power supply apparatus 12 and the tape library apparatus 10 using a resistor 4 and a resistor 7, respectively. When the power supply apparatus 12 is operating normally, a transistor 2 is turned off, a voltage +V is supplied through the pull-up resistor (the resistor 4) in the power supply apparatus 12, and the PW OK is set to a high level. In contrast, when the power supply apparatus 12 is not operating normally (in the case of an abnormal operation), the transistor 2 is turned on, and the PW OK is set to a low level. Moreover, when the power supply apparatus is mounted but there is a problem with the AC cord 14 (disconnection and/or failure), supply of signals from the power supply apparatus is disconnected, so that the voltage +V is supplied through the pull-up resistor (the resistor 7) of the tape library apparatus 10, and the PW OK is set to a high level. That is, it can be said that the PW OK is a normal-state notification signal indicating whether or not a power supply apparatus is operating normally.

The INST and the PW OK are output from the power supply apparatus 12 to the tape library apparatus 10. In the tape library apparatus 10, a control board, which serves as a control unit, monitors the state of the power supply apparatus 12 based on the INST and the PW OK to be input from the power supply apparatus 12. Although not shown in FIG. 5, the control board is connected to the circuit of the tape library apparatus. Then, the control board determines which one of predetermined monitoring settings (a table which defines monitoring results depending on whether each of the signals is set to a high level or a low level) corresponds to the input INST and PW OK. FIG. 6 illustrates the flow of a power supply state monitoring operation in the control board.

The control board determines whether the INST to be input from the power supply apparatus 12 is set to a high level or a low level (S11). If the INST is set to a low level (S11/L), the control board determines whether the PW OK to be input from the power supply apparatus 12 is set to a high level or a low level (S14); if the PW OK is set to a high level (S14/H), the control board determines, as a monitored result, that "the power supply apparatus 12 is mounted in the tape library apparatus 10 and is operating normally" (S15), and if the PW OK is set to a low level (S14/L), the control board determines, as a monitored result, that "the power supply apparatus 12 is mounted in the tape library apparatus 10 but is not operating normally (an abnormal operation)" (S16). In contrast, if the INST is set to a high level (S11/H), the control board detects that the PW OK is set to a high level (as described above, when the INST is set to a high level, the PW OK is also set to a high level) (S12), and determines, as a monitored result, that the power supply apparatus 12 is not mounted in the tape library apparatus 10, or the power supply apparatus 12 is mounted in the tape library apparatus 10 but there is a problem with its AC cord (power is not supplied from the AC cord)" (S13).

FIG. 7 illustrates monitoring results of the control board described above. As shown in FIG. 7, if both the INST and the PW OK are set to a high level, it is impossible to distinguish the state in which "the power supply apparatus 12 is not mounted in the tape library apparatus 10" from the state in which "the power supply apparatus 12 is mounted in the tape library apparatus 10, but there is a problem with its AC cord". In the case in which such a distinction is impossible, there is a possibility that accurate maintenance cannot be performed.

The present invention has been made in view of the above circumstances, and an exemplary object thereof is to provide a power supply state monitoring device, a power supply state monitoring method, and a program that are capable of notifying a user of the fact that there is a problem with an AC cord and the fact that a power supply apparatus itself is not mounted separately.

Means for Solving the Problems

In order to achieve the exemplary object, a power supply state monitoring device of the present invention includes: a determination unit which, when power is supplied from a first power supply apparatus including an AC cord to a main body of an apparatus in which the first power supply apparatus and a second power supply apparatus including an AC cord can be mounted, power being supplied from the second power supply apparatus to the main body of the apparatus, the state of the power supplied from the second power supply being monitored, makes a first determination based on a power-supply mount-state notification signal which is output from the second power supply apparatus and indicates whether or not the second power supply apparatus is mounted in the main body of the apparatus, and if the result of the first determination indicates that the second power supply apparatus is mounted in the main body of the apparatus, makes a second determination based on an AC-supply state notification signal which is output from the second power supply apparatus and indicates whether or not the power is supplied from the AC cord of the second power supply apparatus; and a notification unit which, if the result of the second determination indicates that the power is not supplied from the AC cord of the second power supply apparatus, notifies a user of the fact that the second power supply apparatus is mounted in the main body of the apparatus and the power is not supplied from the AC cord of the second power supply apparatus, wherein the power supply state monitoring device is mounted in the main body of the apparatus.

A power supply state monitoring method of the present invention includes: when power is supplied from a first power supply apparatus including an AC cord to a main body of an apparatus in which the first power supply apparatus and a second power supply apparatus including an AC cord can be mounted, power being supplied from the second power supply apparatus to the main body of the apparatus, the state of the power supplied from the second power supply being monitored, making a first determination based on a power-supply mount-state notification signal which is output from the second power supply apparatus and indicates whether or not the second power supply apparatus is mounted in the main body of the apparatus; if the result of the first determination indicates that the second power supply apparatus is mounted in the main body of the apparatus, making a second determination based on an AC-supply state notification signal which is output from the second power supply apparatus and indicates whether or not the power is supplied from the AC cord of the second power supply apparatus; and if the result of the second determination indicates that the power is not supplied from the AC cord of the second power supply apparatus, notifying a user of the fact that the second power supply apparatus is mounted in the main body of the apparatus and the power is not supplied from the AC cord of the second power supply apparatus.

A program of the present invention causes a computer of a main body of an apparatus to execute: a process of, when power is supplied from a first power supply apparatus including an AC cord to the main body of the apparatus in which the first power supply apparatus and a second power supply apparatus including an AC cord can be mounted, power being supplied from the second power supply apparatus to the main body of the apparatus, the state of the power supplied from the second power supply being monitored, making a first determination based on a power-supply mount-state notification signal which is output from the second power supply apparatus and indicates whether or not the second power supply apparatus is mounted in the main body of the apparatus; a process of, if the result of the first determination indicates that the second power supply apparatus is mounted in the main body of the apparatus, making a second determination based on an AC-supply state notification signal which is output from the second power supply apparatus and indicates whether or not the power is supplied from the AC cord of the second power supply apparatus; and a process of, if the result of the second determination indicates that the power is not supplied from the AC cord of the second power supply apparatus, notifying a user of the fact that the second power supply apparatus is mounted in the main body of the apparatus and the power is not supplied from the AC cord of the second power supply apparatus.

Exemplary Advantageous Effects of the Invention

The present invention can notify a user of the fact that there is a problem with an AC cord and the fact that a power supply apparatus itself is not mounted separately.

MODES FOR CARRYING OUT THE INVENTION

Hereinafter, modes for carrying out (exemplary embodiments of) the present invention will be described in detail with reference to the attached drawings.

Figure 1:
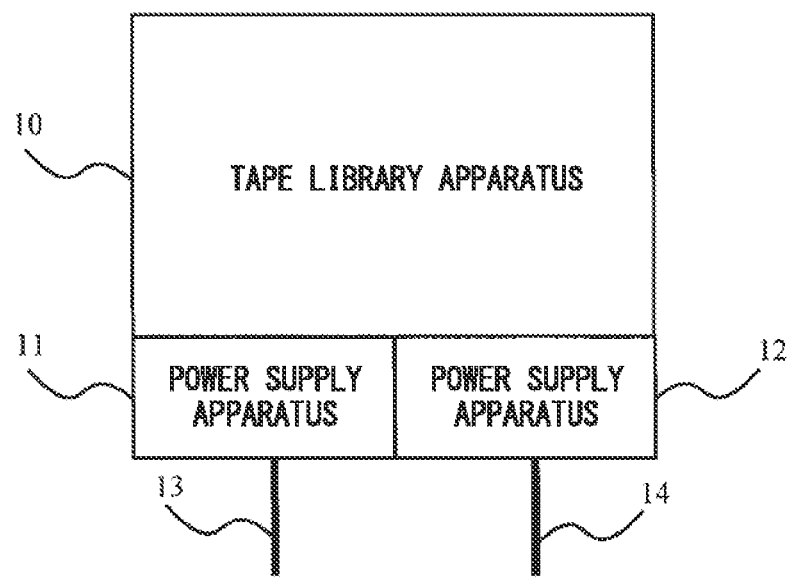
FIG. 1 is a diagram illustrating an example of entire configurations of a tape library apparatus and a power supply apparatus in accordance with an exemplary embodiment of the present invention.

In the present exemplary embodiment, as shown in FIG. 1, an example in which a main body of an apparatus is a tape library apparatus 10 will be described. Two power supply apparatuses 11 and 12 can be mounted in the tape library apparatus 10 to secure the redundancy. The two power supply apparatuses 11 and 12 are provided with AC cords 13 and 14, respectively. The AC cords 13 and 14 are inserted into sockets and so on. Thus, power is supplied to the tape library apparatus 10 through the AC cords 13 and 14 and the power supply apparatuses 11 and 12.

Figure 2:
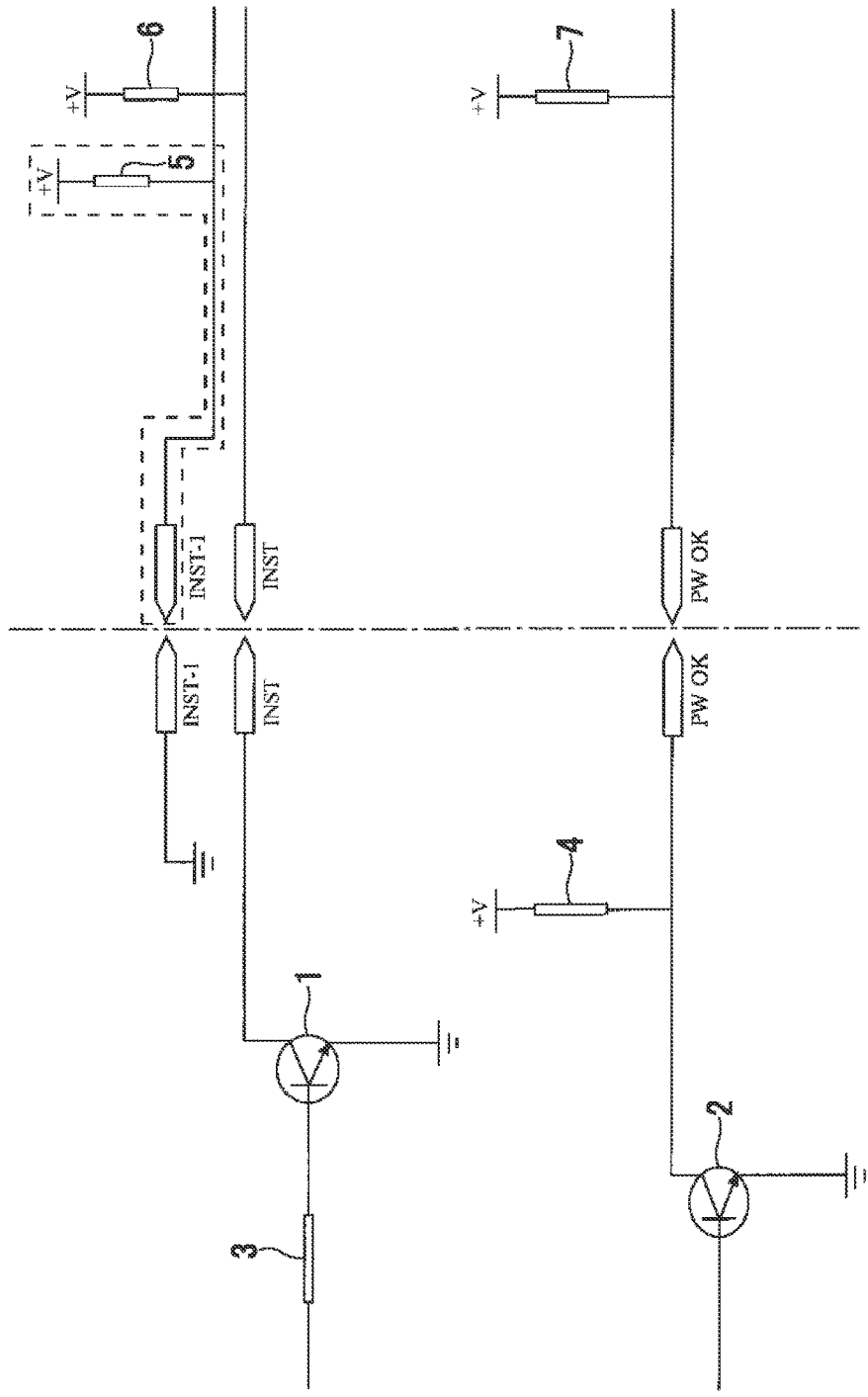
FIG. 2 is a diagram illustrating an example of circuit configurations of the tape library apparatus and the power supply apparatus in accordance with the exemplary embodiment of the present invention.
Figure 5:
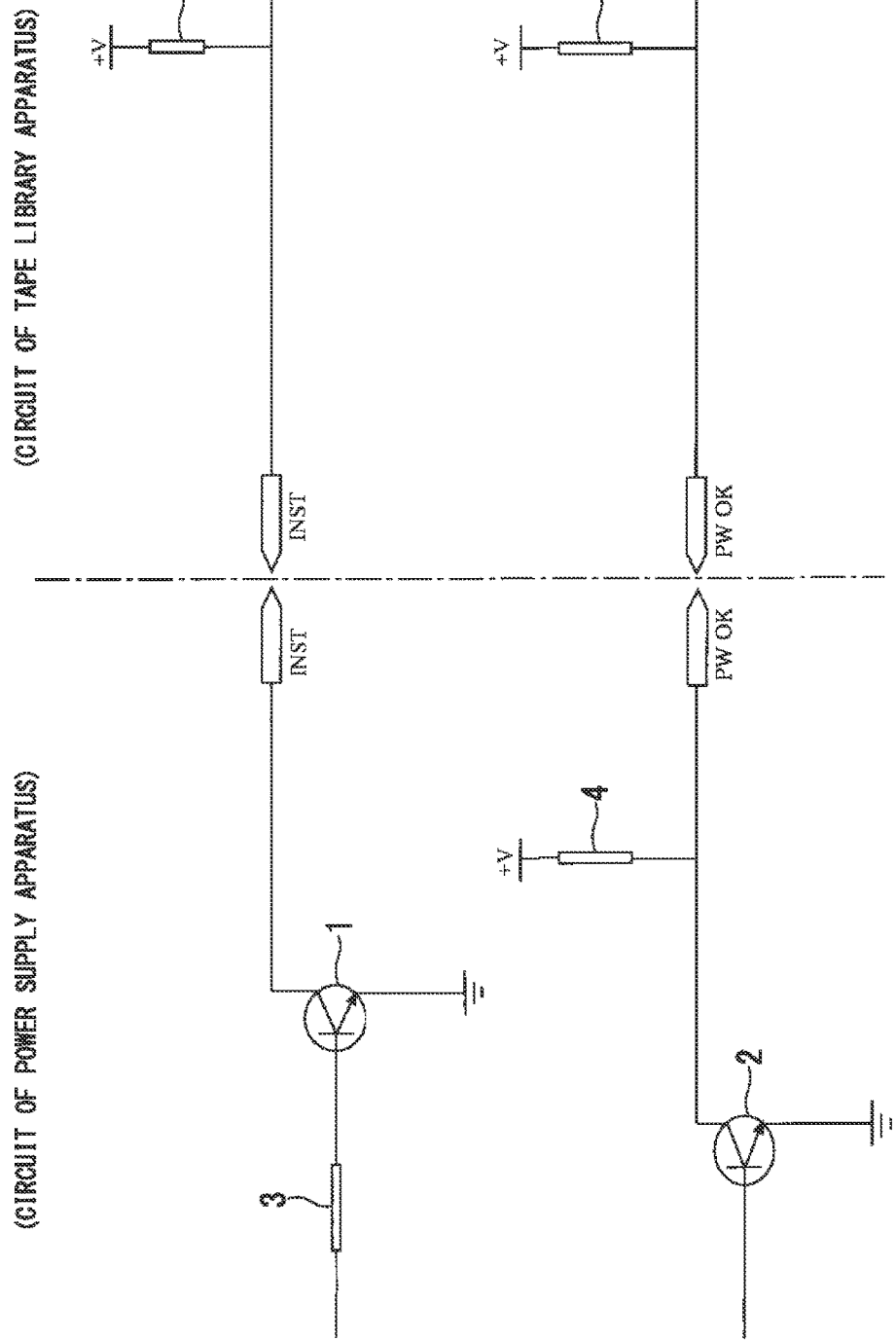
FIG. 5 is a diagram illustrating an example of circuit configurations of a tape library apparatus and a power supply apparatus relevant to the present invention.

FIG. 2 is a diagram illustrating circuit configurations of the above-described tape library apparatus 10 and power supply apparatuses 11 and 12. In FIG. 2, each of the circuits of the power supply apparatuses 11 and 12 is shown on the left of an alternate long and short dash line, and the circuit of the tape library apparatus 10 is shown on the right of the alternate long and short dash line. It is to be noted that although FIG. 2 illustrates the circuit of a tape library apparatus and the circuit of a power supply apparatus in a one-to-one relationship similar to that of FIG. 5, the relationship as shown by the configuration of FIG. 2 exists between each of the circuits of the power supply apparatuses 11 and 12 and the circuit of the tape library apparatus. The configuration of the present exemplary embodiment shown in FIG. 2 differs from the configuration shown in FIG. 5 in that an INST-1 signal and a resistor 5 are added. The other configurations such as the INST and the PW OK are the same as those shown in FIG. 5 (since they are already described, a description thereof is omitted here).

When a power supply apparatus is mounted in the tape library apparatus 10, the INST-1 is grounded by the circuit in the power supply apparatus, and the INST-1 is set to a low level. In contrast, when a power supply apparatus is not mounted in the tape library apparatus 10, the voltage +V is supplied through the pull-up resistor (the resistor 5) of the tape library apparatus 10, and the INST-1 is set to a high level. That is, it can be said that the INST-1 is a power-supply mount-state notification signal indicating whether or not the power supply apparatus is mounted in the main body of the apparatus. The power supply state monitoring of the present exemplary embodiment is characterized in that a determination is based not only on the INST and the PW OK but also on the INST-1.

Figures 3A, 3B:
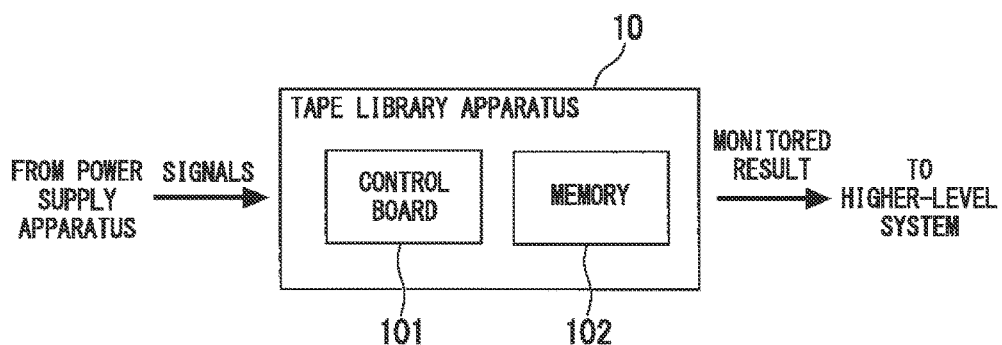
FIG. 3A is a diagram describing a mechanism of power supply state monitoring in the tape library apparatus in accordance with the exemplary embodiment of the present invention.
FIG. 3B is a diagram describing a mechanism of power supply state monitoring in the tape library apparatus in accordance with the exemplary embodiment of the present invention.

FIG. 3A and FIG. 3B are diagrams describing the power supply state monitoring of the present exemplary embodiment. As shown in FIG. 3A, the signals INST-1, INST, and the PW OK are output from the power supply apparatus to the tape library apparatus 10 through the circuit of the power supply apparatus shown in FIG. 2. In the tape library apparatus 10, the circuit of the tape library apparatus shown in FIG. 2 receives these signals. Then, a control board 101 (an example of the power supply state monitoring device of the present invention) determines the state of the power supply based on the input signals and monitoring settings prestored in a memory 102. The monitoring settings mentioned here refer to a table in which monitoring results are predefined depending on whether each of the signals is set to a high level or a low level, and an example of the content thereof is shown in FIG. 3B.

The example shown in FIG. 3B is as follows. When the INST-1 is set to a high level, the INST is set to a high level, and the PW OK is set to a high level, "a power supply apparatus is not mounted in the tape library apparatus" is defined. Moreover, when the INST-1 is set to a low level, the INST is set to a high level, and the PW OK is set to a high level, "a power supply apparatus is mounted in the tape library apparatus, but there is a problem with an AC cord (power is not supplied from the AC cord)" is defined. Moreover, when the INST-1 is set to a low level, the INST is set to a low level, and the PW OK is set to a high level, "a power supply apparatus is mounted in the tape library apparatus, and the power supply apparatus is operating normally" is defined. Moreover, when the INST-1 is set to a low level, the INST is set to a low level, and the PW OK is set to a low level, "a power supply apparatus is mounted in the tape library apparatus, but the power supply apparatus is not operating normally (its operation is abnormal)" is defined. Therefore, the control board 101 determines which monitoring result in the table shown in FIG. 3B corresponds to the input signals to identify the state of the power supply, and then outputs it as a monitored result. The output destination is, for example, a computer (an example of a higher-level system) which is connected to the tape library apparatus 10 and is disposed, for example, at a distant place. Of course, the output destination may be, for example, a display unit provided in the tape library apparatus 10. That is, it is sufficient that the monitored result is output to at least one of the tape library apparatus 10 itself and an apparatus (another apparatus) different from the tape library apparatus 10. The "output" means notification to a user, and an example thereof is display on a screen using characters and so on.

Next, an example of an operation of the power supply state monitoring performed by the control board 101 in accordance with the present exemplary embodiment will be described with reference to FIG. 4. The control board 101 monitors the power supply states of both the power supply apparatuses 11 and 12 shown in FIG. 1. It is to be noted that the description here assumes an example in which the circuit of the power supply apparatus shown in FIG. 2 is the circuit of the power supply apparatus 12, and the power supply state of the power supply apparatus 12 is monitored (it is assumed that the power supply apparatus 11 is mounted in the tape library apparatus 10 and is operating normally, and there is no problem with its AC cord).

First, the control board 101 determines whether the INST-1 to be input from the power supply apparatus 12 is set to a high level or a low level (S1). If the INST-1 is set to a high level (S1/H), the control board 101 notifies the user of the fact that "the power supply apparatus 12 is not mounted in the tape library apparatus 10" as a monitored result in accordance with the monitoring settings of FIG. 3B (S2).

In contrast, if the INST-1 is set to a low level (S1/L), the control board 101 determines whether the INST to be input from the power supply apparatus 12 is set to a high level or a low level (S3). Here, if the INST is set to a high level (S3/H), the control board 101 detects that the PW OK is set to a high level (S4). The reason why the PW OK is set to a high level has been described above. That is, when the power supply apparatus is mounted but there is a problem with the AC cord 14 (disconnection and/or failure), supply of signals from the power supply apparatus is disconnected, so that the voltage +V is supplied through the pull-up resistor (the resistor 7) of the tape library apparatus 10, and the PW OK is set to a high level. Accordingly, when the INST is set to a high level, the PW OK is also set to a high level.

After step S4, the control board 101 notifies the user of the fact that "the power supply apparatus 12 is mounted in the tape library apparatus 10, but there is a problem with its AC cord (power is not supplied from the AC cord)" as a monitored result in accordance with the monitoring settings of FIG. 3B (S5).

If the determination result of step S3 indicates that the INST is set to a low level (S3/L), the control board 101 determines whether the PW OK to be input from the power supply apparatus 12 is set to a high level or a low level (S6). If the result indicates that the PW OK is set to a high level (S6/H), the control board 101 notifies the user of the fact that "the power supply apparatus 12 is mounted in the tape library apparatus 10 and is operating normally" as a monitored result in accordance with the monitoring settings of FIG. 3B (S7). In contrast, if the PW OK is set to a low level (S6/L), the control board 101 notifies the user of the fact that "the power supply apparatus 12 is mounted in the tape library apparatus 10 but is not operating normally (an abnormal operation)" in accordance with the monitoring settings of FIG. 3B (S8).

Figure 4:
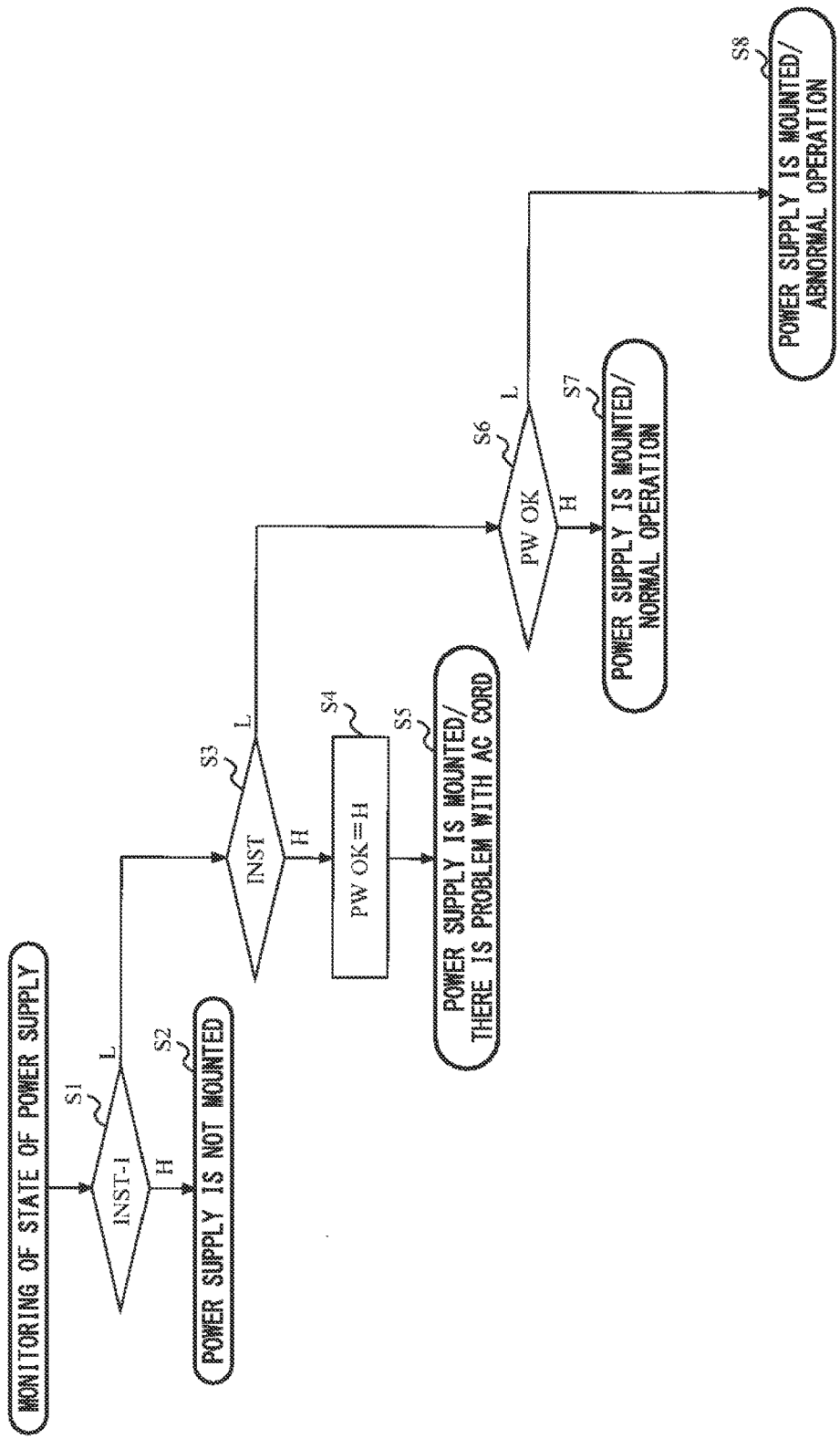
FIG. 4 is a flowchart illustrating an example of an operation of the power supply state monitoring in accordance with the exemplary embodiment of the present invention.
Figures 6, 7:
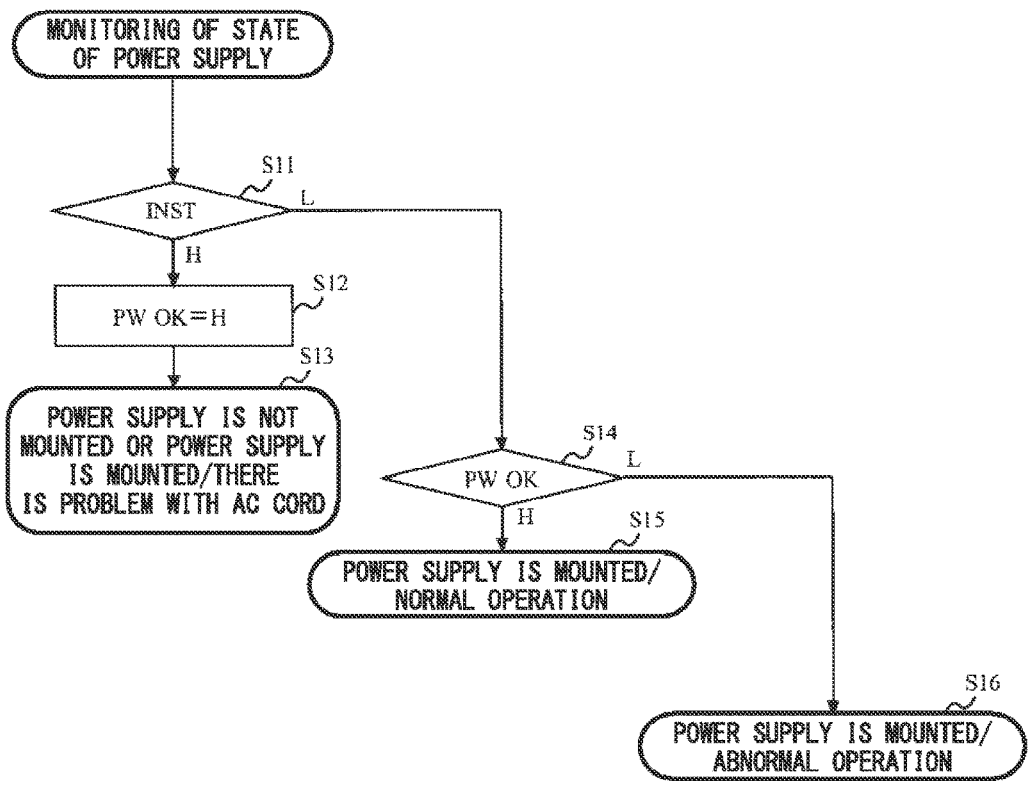
FIG. 6 is a flowchart illustrating an example of an operation of power supply state monitoring relevant to the present invention.
FIG. 7 is a table illustrating a list of monitoring results in the power supply state monitoring relevant to the present invention.

In this way, comparing the flow of FIG. 4 with the flow of FIG. 6, there is a difference in that a determination relating to the INST-1 is made first. As a result of the determination based on the INST-1, in the present exemplary embodiment, it is possible to distinguish the state in which "the power supply apparatus 12 is not mounted in the tape library apparatus 10" (the state in step S2) from the state in which "the power supply apparatus 12 is mounted in the tape library apparatus 10, but there is a problem with its AC cord" (the state in step S5), and to notify the user of that fact. Therefore, it is possible for the user (an operator or a maintenance person) to recognize the distinction and perform accurate treatment and maintenance.

Although exemplary embodiments of the present invention have been described above, the present invention is not limited by the above exemplary embodiments, and various modifications are possible as long as they do not depart from the gist of the present invention.

For example, the operations of the above-described exemplary embodiments can be executed by hardware, software, or a complex configuration of hardware and software.

When processes using software are executed, a program recording a processing sequence may be installed on a memory in a computer embedded in dedicated hardware and the program may be executed. Alternatively, a program may be installed on a general-purpose computer, which can execute various processes, and the program may be executed.

For example, a program can be recorded in advance in a hard disk or a ROM (read only memory) that serves as a recording medium. Alternatively, a program can be temporarily or permanently stored (recorded) in a removable recording medium such as a CD-ROM (compact disc read only memory), an MO (magneto optical) disc, a DVD (digital versatile disc), a USB (universal serial bus) memory, a magnetic disk, and a semiconductor memory. These removable media can be provided as so-called package software.

It is to be noted that a program may be transferred by radio from a download site to a computer, instead of installing a program from the above-described removable recording medium on a computer. Alternatively, a program may be transferred to a computer via a wired network such as a LAN (local area network) and the Internet. The computer can receive the transferred program and install the program on a recording medium such as an embedded hard disk.

Moreover, instead of execution in chronological order in accordance with the processing operations described in the above exemplary embodiments, a configuration of parallel execution or individual execution depending on the processing performance of an apparatus that executes the processing or needs is possible.

Furthermore, in the above exemplary embodiments, an example in which the main body of the apparatus is the tape library apparatus has been described, but the present invention is not limited thereto, and the main body of the apparatus may be any apparatus, any device, or any system which requires power supply for its operation.

This application is based upon and claims the benefit of priority from Japanese patent application No. 2011-076575, filed on Mar. 30, 2011, the disclosure of which is incorporated herein in its entirety by reference.

INDUSTRIAL APPLICABILITY

The present invention can be applied to apparatuses, devices, and systems which require power supply for their operations. The present invention can notify a user of the fact that there is a problem with an AC cord and the fact that a power supply apparatus itself is not mounted separately.

DESCRIPTION OF REFERENCE NUMERALS

1, 2 transistor
3, 4, 5, 6, 7 resistor
10 tape library apparatus
11, 12 power supply apparatus
13, 14 AC cord
101 control board
102 memory

The invention claimed is:
1. An apparatus which requires power supply for operation of the apparatus, the apparatus comprising:
 a memory which stores monitoring settings; and
 a control board which determines a state of the power supply using the monitoring settings stored in the memory,
 wherein, when power is supplied from a first power supply including an AC cord to a main body of the apparatus in which the first power supply and a second power supply including an AC cord can be mounted, power being supplied from the second power supply to the main body of the apparatus, a state of the power supplied from the second power supply being monitored, the control board makes a first determination as to whether or not the second power supply is mounted in the main body of the apparatus based on a power-supply mount-state notification signal which is output from the second power supply and indicates whether or not the second power supply is mounted in the main body of the apparatus, and if the result of the first determination indicates that the second power supply is mounted in the main body of the apparatus, makes a second determination as to whether or not the power is supplied from the AC cord of the second power supply based on an AC-supply state notification signal which is output from the second power supply and indicates whether or not the power is supplied from the AC cord of the second power supply, if the result of the second determination indicates that the power is not supplied from the AC cord of the second power supply, the control board notifies a user of the fact that the second power supply is mounted in the main body of the apparatus and the power is not supplied from the AC cord of the second power supply.

2. The apparatus according to claim 1, wherein if the result of the second determination indicates that the power is supplied from the AC cord of the second power supply, the control board makes a third determination as to whether or not the second power supply is operating normally based on a normal-state notification signal which is output from the second power supply and indicates whether or not the second power supply is operating normally, and if the result of the third determination indicates that the second power supply is operating normally, the control board notifies the user of the fact that the second power supply is mounted in the main body of the apparatus and the second power supply is operating normally, and if the result of the third determination indicates that the second power supply is not operating normally, the control board notifies the user of the fact that the second power supply is mounted in the main body of the apparatus but the second power supply is not operating normally.

3. The apparatus according to claim 1, wherein the control board performs notification to the user through at least one of the apparatus and another apparatus which is connected to the apparatus.

4. The apparatus according to claim 1, wherein the apparatus is in a tape library apparatus.

5. The apparatus according to claim 1, wherein if the result of the first determination indicates that the power supply is not mounted in the main body of the apparatus, the control board notifies the user of the fact that the power supply is not mounted in the main body of the apparatus.

6. A power supply state monitoring method, comprising:
when power is supplied from a first power supply-apparatus including an AC cord to a main body of an apparatus which requires power supply for operation of the apparatus in which the first power supply and a second power supply including an AC cord can be mounted, power being supplied from the second power supply to the main body of the apparatus, a state of the power supplied from the second power supply being monitored, the apparatus comprising a memory which stores monitoring settings, and a control board which determines the state of the power supply using the monitoring settings stored in the memory, the control board making a first determination as to whether or not the second power supply is mounted in the main body of the apparatus based on a power-supply mount-state notification signal which is output from the second power supply and indicates whether or not the second power supply is mounted in the main body of the apparatus;

if the result of the first determination indicates that the second power supply is mounted in the main body of the apparatus, the control board making a second determination as to whether or not the power is supplied from the AC cord of the second power supply based on an AC-supply state notification signal which is output from the second power supply and indicates whether or not the power is supplied from the AC cord of the second power supply; and if the result of the second determination indicates that the power is not supplied from the AC cord of the second power supply, the control board notifying a user of the fact that the second power supply is mounted in the main body of the apparatus and the power is not supplied from the AC cord of the second power supply.

7. A non-transitory computer-readable medium including a program code that, when operated, causes a computer of a main body of an apparatus which requires power supply for operation of the apparatus to execute:
a process in which, when power is supplied from a first power supply including an AC cord to the main body of the apparatus in which the first power supply and a second power supply including an AC cord can be mounted, power being supplied from the second power supply to the main body of the apparatus, a state of the power supplied from the second power supply being monitored, the apparatus comprising a memory which stores monitoring settings and a control board which determines the state of the power supply using the monitoring settings stored in the memory, the control board makes a first determination as to whether or not the second power supply is mounted in the main body of the apparatus based on a power-supply mount-state notification signal which is output from the second power supply and indicates whether or not the second power supply is mounted in the main body of the apparatus;

a process in which, if the result of the first determination indicates that the second power supply is mounted in the main body of the apparatus, the control board makes a second determination as to whether or not the power is supplied from the AC cord of the second power supply based on an AC-supply state notification signal which is output from the second power supply and indicates whether or not the power is supplied from the AC cord of the second power supply; and a process in which, if the result of the second determination indicates that the power is not supplied from the AC cord of the second power supply, the control board notifies a user of the fact that the second power supply is mounted in the main body of the apparatus and the power is not supplied from the AC cord of the second power supply.

8. The apparatus according to claim 2, wherein the control board unit performs notification to the user through at least one of the apparatus and another apparatus which is connected to the apparatus.

9. The apparatus according to claim 2, wherein the apparatus is a tape library apparatus.

10. The apparatus according to claim 3, wherein the apparatus is a tape library apparatus.

11. The apparatus power according to claim 8, wherein the apparatus is a tape library apparatus.

12. The apparatus according to claim 2, wherein if the result of the first determination indicates that the power supply is not mounted in the main body of the apparatus, the control board notifies the user of the fact that the power supply is not mounted in the main body of the apparatus.

13. The apparatus according to claim 3, wherein if the result of the first determination indicates that the power supply is not mounted in the main body of the apparatus, the control board notifies the user of the fact that the power supply is not mounted in the main body of the apparatus.

14. The apparatus according to claim 4, wherein if the result of the first determination indicates that the power supply is not mounted in the main body of the apparatus, the control board notifies the user of the fact that the power supply-apparatus is not mounted in the main body of the apparatus.

15. The apparatus according to claim 8, wherein if the result of the first determination indicates that the power supply is not mounted in the main body of the apparatus, the control board notifies the user of the fact that the power supply is not mounted in the main body of the apparatus.

16. The apparatus according to claim 9, wherein if the result of the first determination indicates that the power supply is not mounted in the main body of the apparatus, the control board notifies the user of the fact that the power supply is not mounted in the main body of the apparatus.

17. The apparatus according to claim 10, wherein if the result of the first determination indicates that the power supply is not mounted in the main body of the apparatus, the control board notifies the user of the fact that the power supply is not mounted in the main body of the apparatus.

18. The apparatus according to claim 11, wherein if the result of the first determination indicates that the power supply is not mounted in the main body of the apparatus, the control board notifies the user of the fact that the power supply is not mounted in the main body of the apparatus.

\* \* \* \* \*

UNITED STATES PATENT AND TRADEMARK OFFICE
CERTIFICATE OF CORRECTION

PATENT NO. : 9,627,887 B2  
APPLICATION NO. : 14/001328  
DATED : April 18, 2017  
INVENTOR(S) : Manabu Watanabe Page 1 of 1

It is certified that error appears in the above-identified patent and that said Letters Patent is hereby corrected as shown below:

In the Claims

Claim 1, Column 9, Line 14:
After "supply,", insert --and--

Claim 4, Column 9, Line 45:
After "is", delete "in"

Claim 6, Column 9, Lines 52-53:
"supply-apparatus" has been replaced with --supply--

Claim 8, Column 10, Line 59:
After "board", delete "unit"

Claim 11, Column 10, Line 66:
After "apparatus", delete "power"

Claim 14, Column 11, Line 15:
"supply-apparatus" has been replaced with --supply--

Signed and Sealed this
Fifth Day of June, 2018

Andrei Iancu
*Director of the United States Patent and Trademark Office*